United States Patent [19]
Dewey et al.

[11] Patent Number: 5,724,501
[45] Date of Patent: Mar. 3, 1998

[54] QUICK RECOVERY OF WRITE CACHE IN A FAULT TOLERANT I/O SYSTEM

[75] Inventors: Matthew C. Dewey, Broomfield; Ellen F. Jones, Golden, both of Colo.

[73] Assignee: EMC Corporation, Hopkinton, Mass.

[21] Appl. No.: 626,245

[22] Filed: Mar. 29, 1996

[51] Int. Cl.⁶ .................... G06F 12/10; G06F 13/14
[52] U.S. Cl. .................... 395/182.07; 395/182.13; 395/182.1; 395/182.03
[58] Field of Search .................... 395/182.13, 185.01, 395/182.1, 182.03, 182.05, 182.04, 182.11, 440, 445, 182.07

[56] References Cited

U.S. PATENT DOCUMENTS

| | | | |
|---|---|---|---|
| 4,430,701 | 2/1984 | Christian et al. | 395/446 |
| 4,467,421 | 8/1984 | White | 395/445 |
| 4,527,271 | 7/1985 | Hallee et al. | 364/184 |
| 4,593,354 | 6/1986 | Ushiro | 395/185.01 |
| 4,672,529 | 6/1987 | Kupersmit | 364/130 |
| 4,791,642 | 12/1988 | Taylor et al. | 371/40.2 |
| 4,920,539 | 4/1990 | Albonesi | 371/40.2 |
| 4,958,351 | 9/1990 | Flora et al. | 371/40.1 |
| 4,995,041 | 2/1991 | Hetherington et al. | 371/40.1 |
| 5,058,116 | 10/1991 | Chao et al. | 371/40.2 |
| 5,140,592 | 8/1992 | Idleman et al. | 395/182.03 |
| 5,148,432 | 9/1992 | Gorden et al. | 395/182.05 |
| 5,155,845 | 10/1992 | Beal et al. | 395/182.04 |
| 5,185,693 | 2/1993 | Loftis et al. | 364/187 |
| 5,185,876 | 2/1993 | Nguyen et al. | 395/841 |
| 5,197,148 | 3/1993 | Blount et al. | 395/182.03 |
| 5,204,963 | 4/1993 | Noya et al. | 395/750 |
| 5,208,813 | 5/1993 | Stallmo | 395/182.05 |
| 5,235,601 | 8/1993 | Stallmo | 371/40.1 |
| 5,235,700 | 8/1993 | Alaiwan et al. | 395/182.11 |
| 5,239,646 | 8/1993 | Kimura | 395/185.07 |
| 5,274,799 | 12/1993 | Brant et al. | 395/182.04 |
| 5,289,589 | 2/1994 | Bingham et al. | 395/308 |
| 5,379,417 | 1/1995 | Lui et al. | 364/481 |
| 5,398,253 | 3/1995 | Gordon | 371/40.4 |
| 5,408,644 | 4/1995 | Schneider et al. | 395/180 |
| 5,412,787 | 5/1995 | Forsyth et al. | 395/400 |
| 5,438,549 | 8/1995 | Levy | 365/229 |
| 5,469,566 | 11/1995 | Hohenstein et al. | 395/182.04 |
| 5,499,377 | 3/1996 | Gordon | 395/200.01 |
| 5,504,882 | 4/1996 | Chai et al. | 395/182.03 |
| 5,522,065 | 5/1996 | Neufeld | 395/182.04 |
| 5,526,482 | 6/1996 | Stallmo | 395/182.04 |
| 5,586,291 | 12/1996 | Lasker | 395/440 |
| 5,588,110 | 12/1996 | Dekoning et al. | 395/182.03 |
| B1 4,965,717 | 10/1990 | Cutts, Jr. et al. | 395/182.1 |

FOREIGN PATENT DOCUMENTS

| | | |
|---|---|---|
| 0416968A2 | 8/1990 | European Pat. Off. . |
| WO89/09468 | 10/1989 | WIPO . |

OTHER PUBLICATIONS

Gray, J., Horst, B., and Walker, M.; Parity Striping and Disc Arrays: Low-Cost Reliable Storage with Acceptable Throughput (Jan. 1990).

Ousterhout, J., and Douglis, F., Beating the I/O Bottleneck: A Case for Log-Structured File Systems (Aug. 4, 1988).

*Primary Examiner*—Ly Hua
*Attorney, Agent, or Firm*—William J. Kubida; Holland & Hart LLP

[57] ABSTRACT

A method for recovering data from a cache memory of a second storage controller by access to a cache memory of a first storage controller is presented. The storage controllers are coupled by a private common data path. The method includes copying metadata corresponding to the data stored in the cache memory of the second storage controller to the cache memory of the first storage controller through the private common data path. The metadata may include pointers to and the size of the data. After copying the metadata pointers, the data in the cache memory of the second storage controller is established in the cache memory of the first storage controller. As a result, the entire set of data does not need to be totally recovered to the hard disk before resuming host communications in a recovery operation, which may take a relatively long time. Instead, if a controller fails, only a portion of the data in the cache of the failed controller, the data describing the recovery information, needs to be incorporated into the "dirty" cache of the remaining controller before communications with the host are resumed.

5 Claims, 10 Drawing Sheets

1

QUICK RECOVERY OF WRITE CACHE IN A FAULT TOLERANT I/O SYSTEM

BACKGROUND OF THE INVENTION

1. Field of the Invention

This invention relates to improvements in fault tolerant data processing systems and methods. More particularly, this invention relates to improvements in fault tolerant data processing systems and methods of the type described for reducing the unavailability of user data during controller switchover due to cache recovery.

2. Background Information

In order to provide a fault tolerant cache in a dual controller I/O system, data written by an "uncommitted" host are written into a fault-tolerant, non-volatile memory. Usually, this means that the data is mirrored into two memory banks. In the case of a controller failure, the surviving controller must access the data from one or both of the memory banks to write the data to permanent non-volatile storage, usually provided on one or more disks.

In practice, such mirroring is accomplished either by a back end copy technique or by an onboard mirroring technique. In implementing the back end copy technique data is written from the host into the memory of the primary controller, and the data is mirrored over a secondary channel to the memory of a backup controller. Though this design may be implemented in other ways, the most cost effective implementation brings the data onboard from the host, and subsequently copies it to the backup controller over the secondary channel. The secondary channel must have sufficient protection to allow errors to be detected in the transfers so that the controller can disable write caching when the back-up data is suspect.

One of the disadvantages of this technique is that the host sees a longer latency than it would otherwise experience in an optimal implementation, due to the serial back end copy. Thus, the secondary channel should be of relatively high bandwidth to reduce this latency. This technique also consumes additional controller bandwidth, compared to an optimal solution. In addition to the additional bandwidth required for mirroring, regardless of its particular implementation, this design also consumes bus bandwidth on the backup controller in order to write the data to its memory. If the backup controller is an active standby type controller, this bandwidth consumption will interfere with the host I/O on the backup controller.

Of course, one advantage of this type of design is that if a failure of a controller occurs, the data is already in the memory of the backup controller. This allows the backup controller to pick up the load from the failed primary controller quickly. Thus, this design trades extra latency and bandwidth consumption during nominal host write operations for a quick recovery during controller failures.

In implementing the onboard mirroring technique, the data for a host write is mirrored directly into two independent banks of memory of the primary controller. In case of a controller failure, the data is copied from the memory of the failed controller to the memory of a backup controller over a fault tolerant secondary channel. Since the secondary channel does not figure into the normal host I/O response time, its bandwidth can be low to reduce cost.

If a controller fails, the backup controller has none of the cache information onboard required to resume host I/O. Therefore, all of the cache information must be fetched across the secondary links once a controller failure is detected. If the bandwidth of the secondary channel is low, the time to recover the cache information can be long. During this recovery period, the host I/O cannot be allowed since the backup controller does not typically have a coherent copy of the data. The onboard mirrored memory must be protected from corruption even through failure of other components on the board.

Through the use of the onboard mirroring technique, the host sees no additional latency due to the mirroring of data, and performance can approach optimal during normal host I/O. Since the copy of data the backup controller only occurs on failures, the secondary links can be constructed with limited bandwidth, without affecting the host I/O response time. Having both memories on the same board allows ECC memory to be constructed for the same cost as mirrored parity protected memory. This design trades longer host unavailability when a controller fails and some on board design complexity for a lower bandwidth and lower cost controller interconnect, with essentially no performance impact on the host I/O when no failure is present.

SUMMARY OF THE INVENTION

In light of the above, therefore, it is an object of the invention to provide improved fault tolerant data processing systems and methods.

It is another object of the invention to provide improved fault tolerant data processing systems and methods of the type described for recovering cache mirrored data.

It is yet another object of the invention to provide an improved method to reduce the unavailability of user data during controller switchover due to cache recovery.

These and other objects, features and advantages of the invention will be apparent to those skilled in the art from the following detailed description of the invention, when read in conjunction with the accompanying drawings and appended claims.

This invention is primarily concerned with controllers that execute data exchanges between requesting host computers and one or more satellite data storage units associated with the controllers. The invention is described herein with respect to an embodiment having a caching disk array controller in a fault tolerant disk array subsystem.

According to a broad aspect of the invention, a method is presented for recovery of data from a cache memory of a first storage controller by access to a cache memory of a second storage controller, the first and second storage controllers being coupled by a private common data path or paths. The method includes copying to the cache memory of the second storage controller metadata, which represents pointers to and the size of the data stored in the cache memory of the first storage controller through the private common data path.

According to another broad aspect of the invention, a method is presented for allowing a host computer access to data from a mirrored cache memory of a second storage controller. The access is enabled by issuing a request to a first storage controller, which also has a cache memory. The first and second storage controllers are coupled to a common computer mass storage bus having at least one common data path between them. In performing the method, data and associated metadata are stored in the respective cache memories of the first and second storage controllers. The metadata is copied from the cache memory of the second storage controller to the cache memory of the first storage controller through the private common data path. The host computer directs requests to the first storage controller for access to selected portions of the data stored in the cache memory of the second storage controller by reference to the associated metadata that has been copied from the second storage controller cache memory copied to the first storage controller cache memory, and the selected portions of the data are transmitted through the private common data path from the cache memory of the second storage controller to the host computer.

According to yet another broad aspect of the invention, a computer system is presented. The system includes at least one host computer and a plurality of storage controllers coupled to the host computer. A subset of the storage controllers is coupled together through a private data path or paths. The subset of the storage controllers has a local cache memory for storing respective data and associated metadata. At least one data storage unit is coupled to a computer mass storage bus coupling the subset of the storage controllers. Means are provided for copying the metadata from the cache memory of a second one of the subset of the storage controllers to the cache memory of a first one of the subset of the storage controllers through the private data path or paths, whereby a request from the host computer to the first one of the storage controllers for access to selected portions of the data stored in the cache memory of the second one of the storage controllers is achieved by reference to the associated metadata copied from the second storage controller cache memory copied to the first storage controller cache memory.

BRIEF DESCRIPTION OF THE DRAWINGS

In the various figures of the drawings, like reference numerals are used to denote like or similar parts.

DETAILED DESCRIPTION OF THE PREFERRED EMBODIMENTS

The preferred embodiments of the present invention are described in the environment of a data processing system, including at least one host computer and a pair of disk subsystems, each responsive to a separate cached disk array controller. (It should be noted that although a pair of disk subsystems are shown, the method of the invention can also be practiced in a single disk system using separate disk array controllers.) Fully redundant data paths, such as SCSI links, interconnect the host with the controllers and interconnect the controllers, as well. Independent private paths are provided to write data to the memory in a mirrored fashion to protect data against loss.

To facilitate the quick recovery of data lost as a result of a controller or cache failure, a method and apparatus for recovering mirrored data in the cache is presented. The method includes placing the memory module associated with a failed controller in a fail-over mode in which data is recovered in two stages, using a battery backup. A portion of the memory contains a summary of all of the mirrored data, or "metadata." The metadata contains a list including a disk address, a cache address, and an indicator of data size. The metadata provides a summary record of all data that was written to the cache from the host, but does not contain a record of any non-mirrored data in the cache, such as data that was written to the cache from the disk.

Upon a controller failure, the metadata is first copied to a backup controller over a serial link between a backup controller and the failed controller. The quick recovery of this metadata, for example, on the order of three seconds, allows the backup controller to resume operation after a relatively brief primary recovery stage. During a secondary recovery stage, the backup controller processes new host commands in the foreground and fetches mirrored data from the failed cache in the background.

Figure 1:
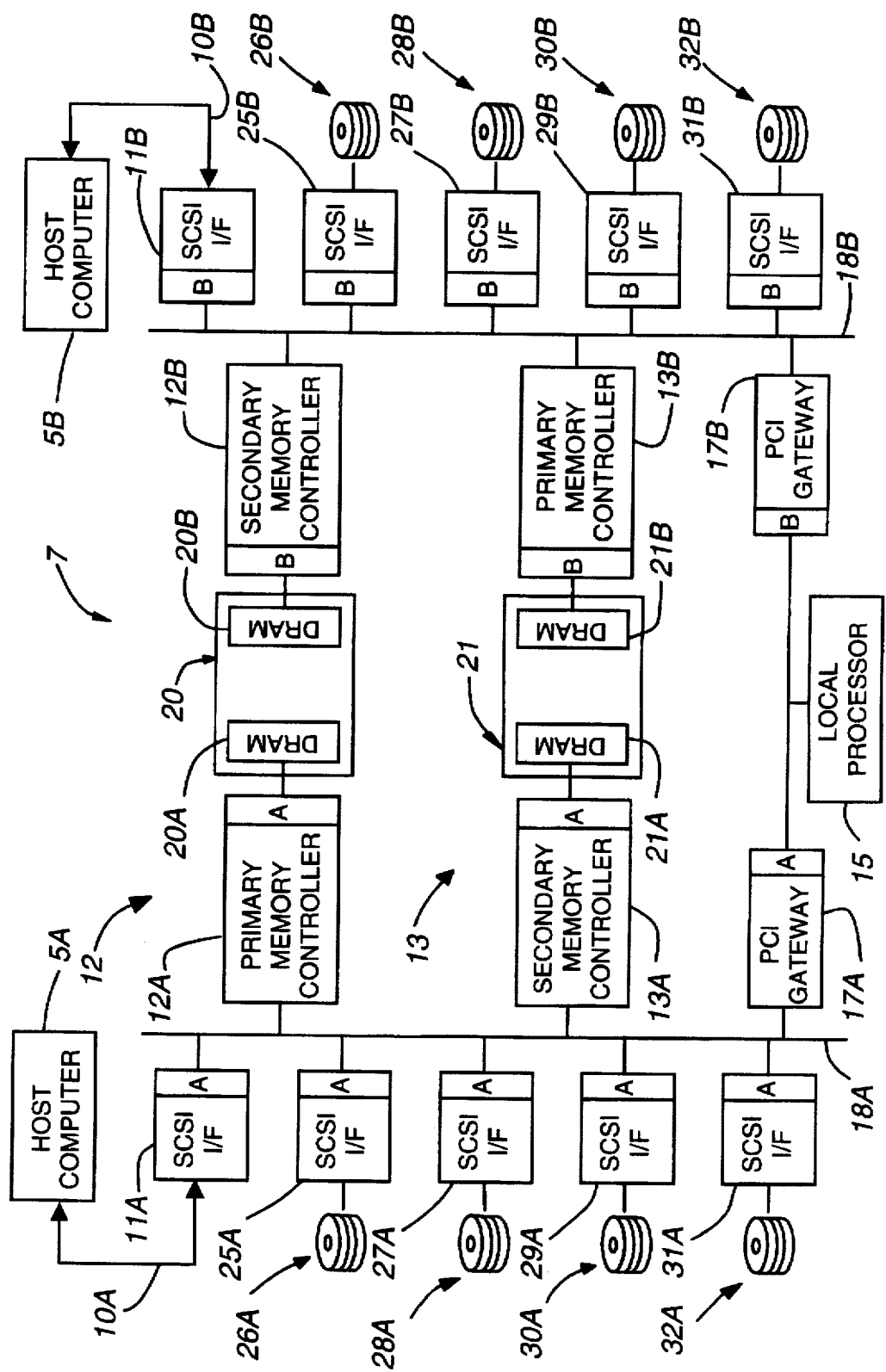
FIG. 1 is a block diagram of one type of fault tolerant disk array controller system that is useful in conjunction with a preferred embodiment of the present invention.

A block diagram of a fault tolerant disk array controller 7 useful in conjunction with a preferred embodiment of this invention is shown in FIG. 1. One or more host computers, two host computers 5A and 5B being shown, communicate with the controller 7 via buses 10A and 10B. The buses 10A and 10B are well-suited for implementation by or cooperation with fiber-optic structures, which may be connected into host interface devices 11A and 11B, illustrated as being of a Small Computer System Interface (SCSI) type. Both commands and data between the host computers, all of which can occur concurrently, are handled via the buses 10A and 10B. A local processor 15 strips host originated command signals from the interfaces 11A and 11B through PCI buses 18A and 18B, as well as PCI gateways 17A and 17B, to direct the operation of the memory controllers 12 and 13 in handling the data associated with those commands.

A primary memory controller 12A and a secondary controller 12B interact with a fast memory 20, and a secondary controller 13A and a primary controller 13B interact with a fast memory 21. The size of the fast memories 20 and 21 are selectable by the user, for example, through use of Dynamic Random Access Memory (DRAM) modules. In the example shown in FIG. 1, the memory 20 is configured by the user to incorporate two DRAM modules 20A and 20B and the memory 21 is configured to incorporate two DRAM modules 21A and 21B. Of course, either memory can function with a greater number of modules or with a single DRAM module.

The memories 20 and 21 essentially perform as buffers between the disk interfaces, e.g., interfaces 25A-B, 27A-B, 29A-B, and 31A-B with their respectively associated disk storage units, e.g., 26A-B, 28A-B, 30A-B, and 32A-B for data received from, or intended for, the remote host. The primary memory controllers 12A and 13B, as well as the secondary memory controllers 13A and 12B, are typically Application Specific Integrated Circuits (ASICs). The A and B sides use a pair of such ASICs to accommodate the segregation of the power system for fault tolerance as is described in greater detail below.

The use of multiple memory modules further increases the memory bandwidth. This eases the signal timing constraints required to operate the DRAM in a high bandwidth system. It is preferable to employ many memory modules within as close a proximity to each other as possible, as the use of modules thatare separated by some distance tends to degrade high speed signals. This degradation increases as a function of distance. as a function of distance.

Figure 4:
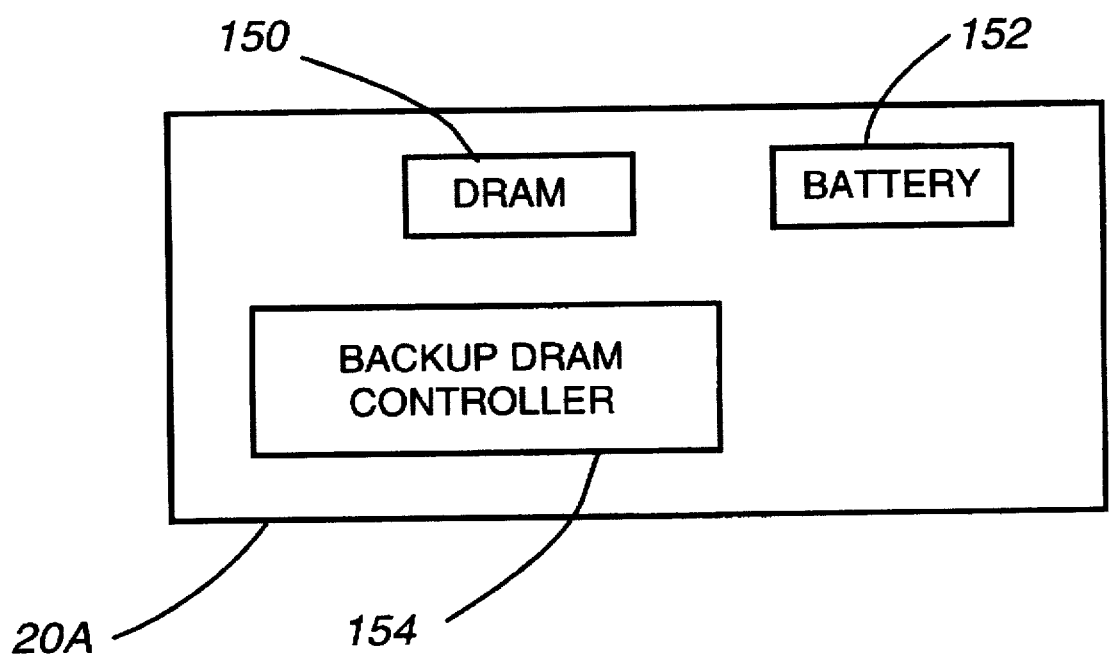
FIG. 4 is simplified block diagram showing the components of a single memory.

Fault tolerance is important for the buffered memory units 20 and 21, which are volatile memory units, unlike the disk drives 25–32 which are non-volatile. A power failure ordinarily results in a loss of data in the volatile portion of the memory. For this reason, separate power sources are used to power the controllers and the memory modules. In addition, fault tolerant battery backup may be provided onboard each of the memory modules 20A-B and 21A-B to assure that data stored in these volatile memories can be recovered. The memory modules cooperate with respective memory buses into the ASIC modules 12 and 13. As shown in FIG. 4, a representative memory module 20A comprises a volatile DRAM memory 150, a battery power backup 152, and a DRAM controller 154. In the event of power failure, the DRAM memory 150 is maintained for a time interval sufficient to recover data.

In addition to the hardware redundancy to assure that data written to caches 20 and 21 is not lost or corrupted, the data itself is redundantly processed in a cache so that data lost or corrupted in one memory location can be retrieved from another.

Read requests need to be handled differently than write requests. Data that is cached in the memories in response to read commands from the host exists on the disk drives 26, 28, 30, and 32, and is held in memories 20 and 21 for fast read access for the host. Therefore, loss of this data from memories 20 and 21 is tolerable should a component fail, since it can be retrieved from the disk drive. On the other hand, loss of data intended for writing to the disk drives is intolerable, since this data only exists in the volatile DRAM cache and can be lost if there is a power failure. The write data is thus written in a mirrored fashion both to the data memory 20A through the controller 12A, and to the mirror memory 21A through the controller 13A.

By setting registers in the memory controllers 12 and 13, some part of the memory is operated in a mirrored fashion to hold host write data, so that each byte stored is stored in two memories, and thus requires two bytes of memory. The remaining memory stores one byte of data using one byte of the memory and a parity bit scheme sufficient to detect corrupted data as might result from an undetected component failure.

Figure 2:
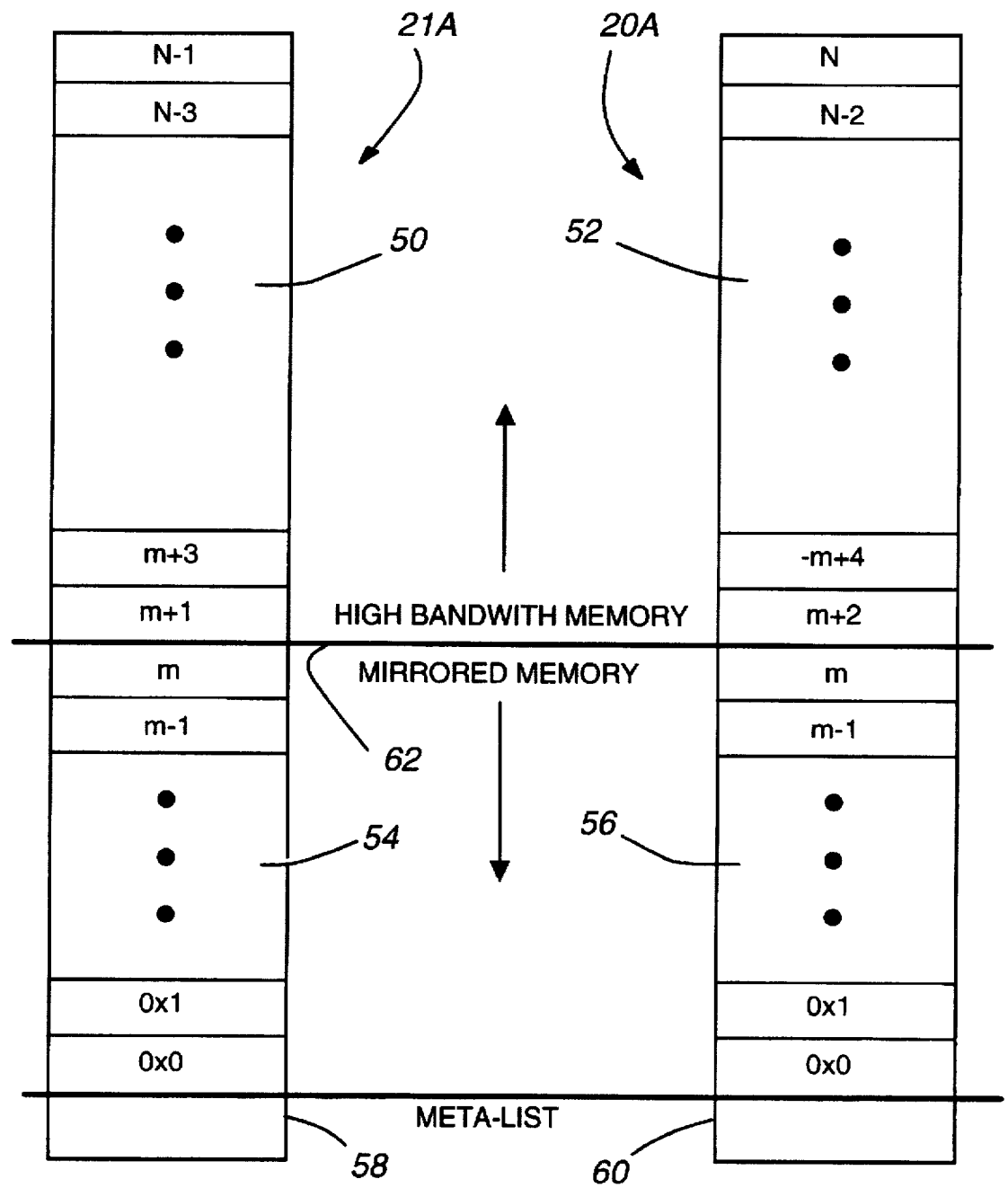
FIG. 2 shows the dynamic use of a mirrored memory and metadata-list in the FIG. 1 environment to assist fault tolerant operation.

Accordingly, the system advantageously employs fault tolerance to boost performance. FIG. 2 depicts a memory configuration in which the non-mirrored portions 50 and 52 of memories 21A and 20A function at twice the bandwidth of the mirrored memory portions 54 and 56. The memory portions 54 and 56 are dynamically configured to operate in a mirrored fashion. The non-mirrored memory is reserved for data written from disk to cache in response to a host read request. The mirrored memory is reserved for data written from host to cache for eventual storage on disk. The boundary 62 is the demarcation between the mirrored and non-mirrored portions of the memories 21A and 20A. The memory portions 50 and 52 store data successively in interleaved fashion in the two memories, so that the read bandwidth is doubled by operating both simultaneously. The remaining portions of the memory 58 and 60 store a metadata list of all data contained in mirrored memory sections 54 and 56, respectively. This metadata list contains a disk address, a cache address, and an indicator of data size. The list does not contain any information on the non-mirrored memory sections 50 and 52.

The fault tolerant requirement for holding write data from the host in redundant memories necessitates redundant data paths, as well. This invention advantageously utilizes the redundant data path when transferring non-mirrored data by operating both data paths with successively stored, interleaved data.

Figure 3A:
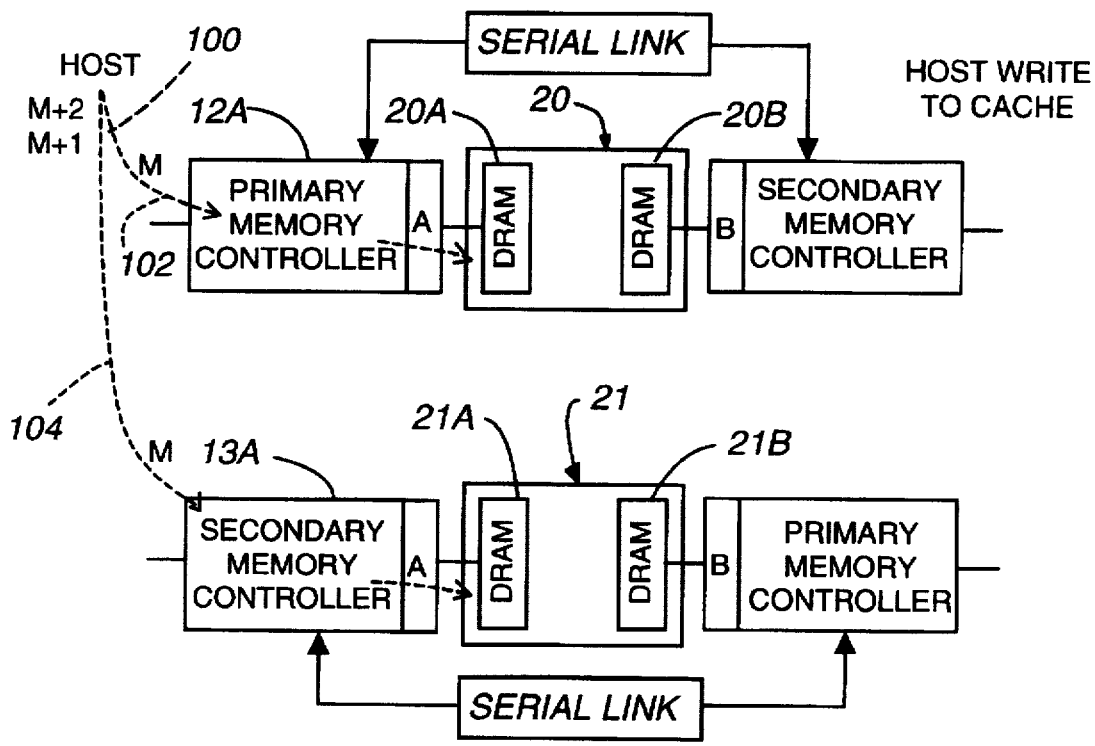
FIG. 3A is a block diagram of a pair of redundant controller systems showing a host write to cache.

In operation, a host write to the memory cache is performed as a foreground operation. The data to be written is presented on bus 10A and is processed by the interface controller 11A, the PCI bus 18A, the memory controllers 12A and 13A, the memories 20 and 21, the interfacing gateway circuit 17A, and the local processor 15. A remote host computer 5A transfers the write command through the host interface 11A into the local processor 15 where the command is interpreted. The processor 15 determines the functions required and directs the various components in storing data received from the remote host computer 5A. As a result, the local processor 15 causes a transfer of the host data through the host interface 11A into the mirrored DRAM address space. The data 100, as shown in FIG. 3A, is stored in parallel paths 102 and 104 into the DRAM 20A of the memory 20 connected to controller 12A and into the DRAM 21A of the memory 21 connected to controller 13A. The received data is written into both DRAM memories 20A and 20B simultaneously, therefore, no degradation of performance occurs. The interface device 11A then notifies the processor 15 that the commands and/or data are stored. The host is notified when the writing is finished with an acknowledgment from the processor 15.

The boundary 62 between the mirrored data and the high bandwidth portions of the memory is dynamically shiftable under the control of the local processor 15. Since the system can concurrently accommodate several write-data requests, as well as several requests to read data from the disk drives, the local processor inspects the magnitude of the write-data input and dynamically shifts the boundary 62 accordingly.

Because the controller has data stored in two places, it is acceptable to acknowledge the write command before it is actually on a disk. The data thus stored is then secure from degradation from a single point of failure. A "fast write" operation may then be completed by generating an acknowledgment signal in response to the host command, indicating to the host that the write is complete, despite the fact that the data is not yet in any of the disk storage units.

A mirrored write from the cache to disk is performed as a background operation. Accordingly, the local processor 15 completes the write to disk as a background operation consistent with a given cache policy to maximize system throughput. The write to disk is accomplished by transferring the temporarily stored data from the memory unit 20A into one or more of the disk SCSI interfacing devices 25A, 27A, 29A, and 31A for storage on the disk medium. As an example, the transfer of mirrored write data to an "A-side" disk involves the local processor 15, the fast memories 20A and 21A, the controllers 12A and 13A, the PCI gateway 17A, the PCI bus 18A, one or more of the SCSI interfaces 25A, 27A, 29A, and 31A, and one or more of the associated disk drives 26A, 28A, 30A, and 32A. The local processor 15 sets up a transfer of data from the memory to a disk through a SCSI interface circuit. Data is read from the mirrored portion of the memory address space so both the secondary memory controller 13A and the primary memory controller 12A read the respective portions 54 and 56 of DRAM memories 21A and 20A attached thereto.

Figure 3B:
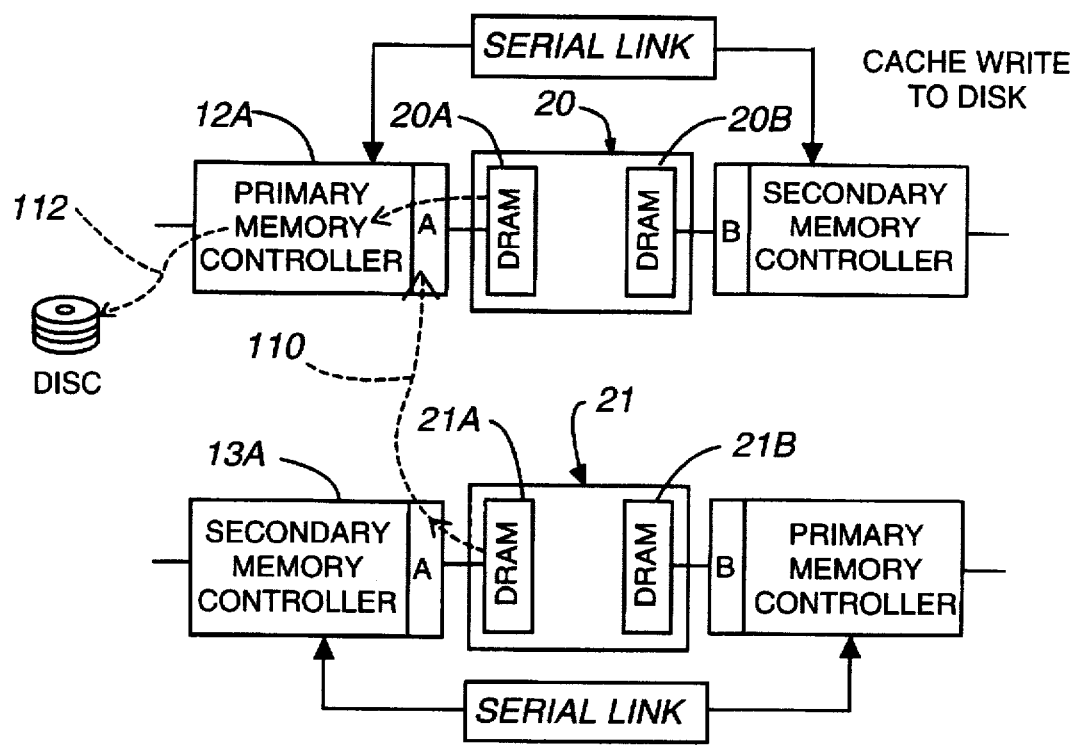
FIG. 3B is a block diagram of a pair of redundant controller systems showing a cache write to disk.

As shown in FIG. 3B, the write data read by the secondary memory controller 13A is conveyed 110 to the primary memory controller 12A, and the primary memory controller compares this data with the data read from the DRAM memory 20A attached to it. If the compare is successful, the data is transferred 112 across the PCI bus 18A to one or more disk drives 16A, 28A, 30A, and 32A via SCSI interfaces 25A, 27A, 29A, and 31A. A failure to compare is followed by a check of the stored parity information. Data with good parity is placed upon the PCI bus 18A. All comparison failures are signaled to the local processor 15.

In the event of a cache hit, the data is read from cache in an interleaved manner and delivered to the host. The requests to read data do not require mirrored operation. Thus, they are alternately handled by the memories 20 and 21 beginning with a first location, N, followed by a subsequent location, N-1, and so forth. The local processor 15 normally allocates a maximum amount of fast memory for higher bandwidth functions, but it must ensure that the boundary 62 is appropriately positioned to accommodate all the received data associated with write requests. As mentioned, it is not possible to recover from a loss of write data within the disk array controller environment, but it is possible to retrieve data from the disk drives as it resides therein in protected form, even after transfer to the fast memory in response to a host read request.

A host request to read data is similar to a write request, except the data is transferred to the host, and the memory is used in its high bandwidth configuration. The data that is to be read is stored in the non-mirrored portions 50 and 52 of the memories 21A and 20A. A read command from the host to the interface 11A causes the primary memory controller 12A and the secondary memory controller 13A to read the memories 21A and 20A. Moreover, the memories 21A and 20A are read in an interleaved fashion to further increase the read rate.

Figure 3C:
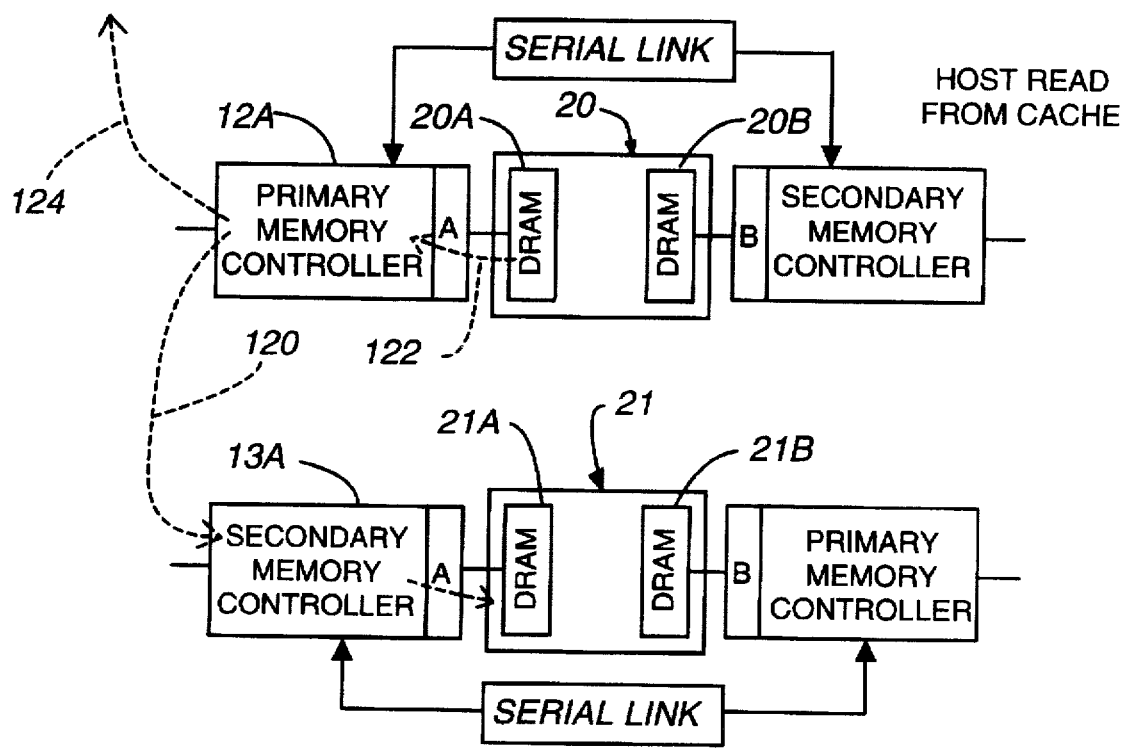
FIG. 3C is a block diagram of a pair of redundant controller systems showing a host read from disk.

As is shown in FIG. 3C, the data read by the secondary memory controller 13A is passed to the primary memory controller 12A, as indicated by dotted line 120. The primary controller 12A interleaves the data from the memory 20A as it transfers the combined data across the PCI bus 18A to host interface 11A, indicated by dotted lines 122 and 124.

During a read operation, parity appropriate to the memory word size is checked to assure that the data is not corrupted. If the check determines that the parity data is not correct, the transaction is aborted, and the local processor 15 is notified to take corrective action. It should be noted, however, that the data is still accessible by the host through the disk drives.

In the event of a cache miss, the interleaved data is read from the disk for delivery to the host. Transfer of the data that is read from the from disk for delivery to host involves the local processor 15, the fast memories 20A and 21A, the controllers 12A and 13A, the PCI gateway 17A, the PCI bus 18A, one or more of the SCSI interfaces 25A, 27A, 29A, and 31A, and one or more of the associated disk drives 26A, 28A, 30A, and 32A. The local processor 15 sets up a transfer of a read request from the host to the controllers 12A and 13A. If data corresponding to the read address is not present in the caches 20A and 21A, then a cache miss signal is sent to the processor 15. Data is then read from one or more of the disks to the host from the disks through the SCSI interface circuit.

Figure 3D:
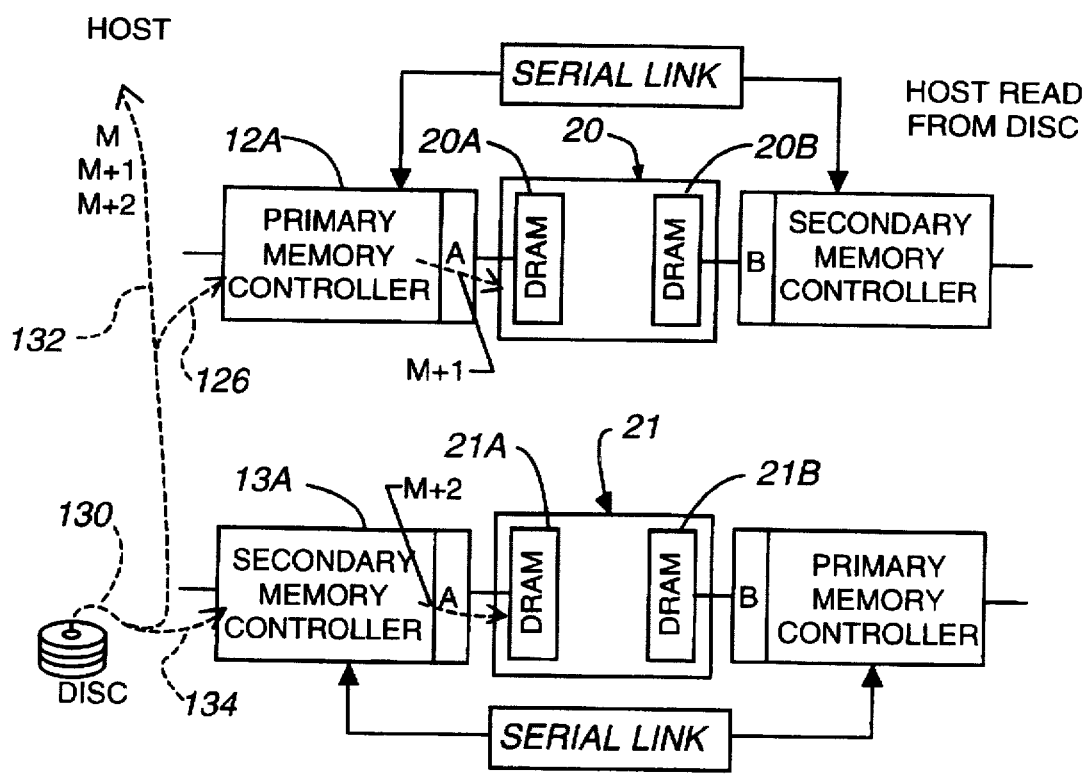
FIG. 3D is a block diagram of a pair of redundant controller systems showing a host read from cache.

Thus, as shown in FIG. 3D, data that is read from the disk is sent to the host interface 11A, as indicated by the dotted lines 130 and 132. As the data is transferred across the PCI bus 18A to the host interface 11A and the controllers 12A and 13A in cooperative fashion, the data is parsed off the bus 18A, in interleaved format. The interleaved data is copied in interleaved fashion, to the non-mirrored portions of caches 20A and 21A as indicated by the dotted lines 126 and 134.

Figure 3E:
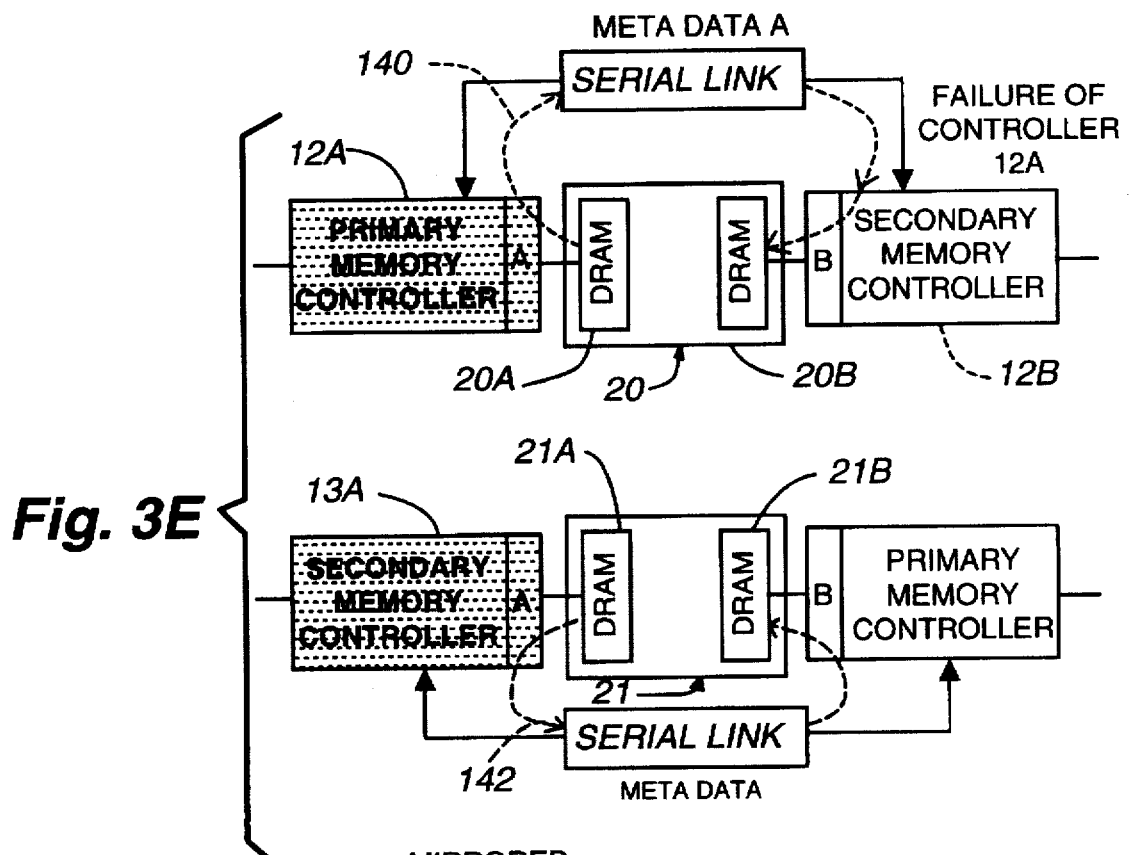
FIG. 3E is a block diagram of a pair of redundant controller systems, one pair of which has failed, showing the recovery of a metadata list to a backup cache.

The operation of the system in the event of a failure is shown in FIG. 3E. In FIG. 3E, a failed component is shown by shading. Such failure, may be, for example, caused by a loss of power, or similar cause. It is noted that in the failure mode illustrated the disk drives are supplied by separate power sources, and the primary controller 13B and the secondary controller 12B, along with the memory 20B and 21B, remain active. The failing controllers 12A and 13A shut themselves down and turn their operation over to the redundant controllers 12B and 13B. This failure mode is made possible by the separation of power sources between pairs of controllers and by the provision of auxiliary battery backup power to the memory units, as shown in FIG. 4 described above.

More specifically, the power supplied to the controllers 12A and 12B is segregated such that a failure of either power supply will not cause data loss in both of the memories of either controller. This is important where those memories are used in a mirrored configuration to hold write data received from the host. This allows host write data recovery by operation of controllers 12B and 13B to transfer that data from memories 20A and 21A over the serial dump links 140 and 142 respectively as shown in FIG. 3E. The recovered data is the write data contained in the fast memory associated with the failed controllers 12A and 13A, which data is then written to one or more of the disks.

The recovered data is transferred during a first fail-over stage as a metadata list, referred to and discussed above in connection with FIG. 2. Given the restricted bandwidth of serial links 140 and 142 and the large amount of data contained in memories 20A and 21A, it is advantageous in terms of minimizing the recovery interval upon failure of one controller to immediately transfer the metadata list portions 58 and 60 to the surviving controller, as opposed to the full contents of mirrored memory 54 and 56. As described above, the metadata lists 58 and 60 contain a summary listing of the mirrored portion of the memory units 21A and 20A.

During the primary and secondary recovery intervals, the onboard auxiliary battery power maintains the volatile memory units 20A and 21A until such time as a full transfer of the metadata list and all mirrored data to the memories 20B and 21B has been accomplished.

Figure 3F:
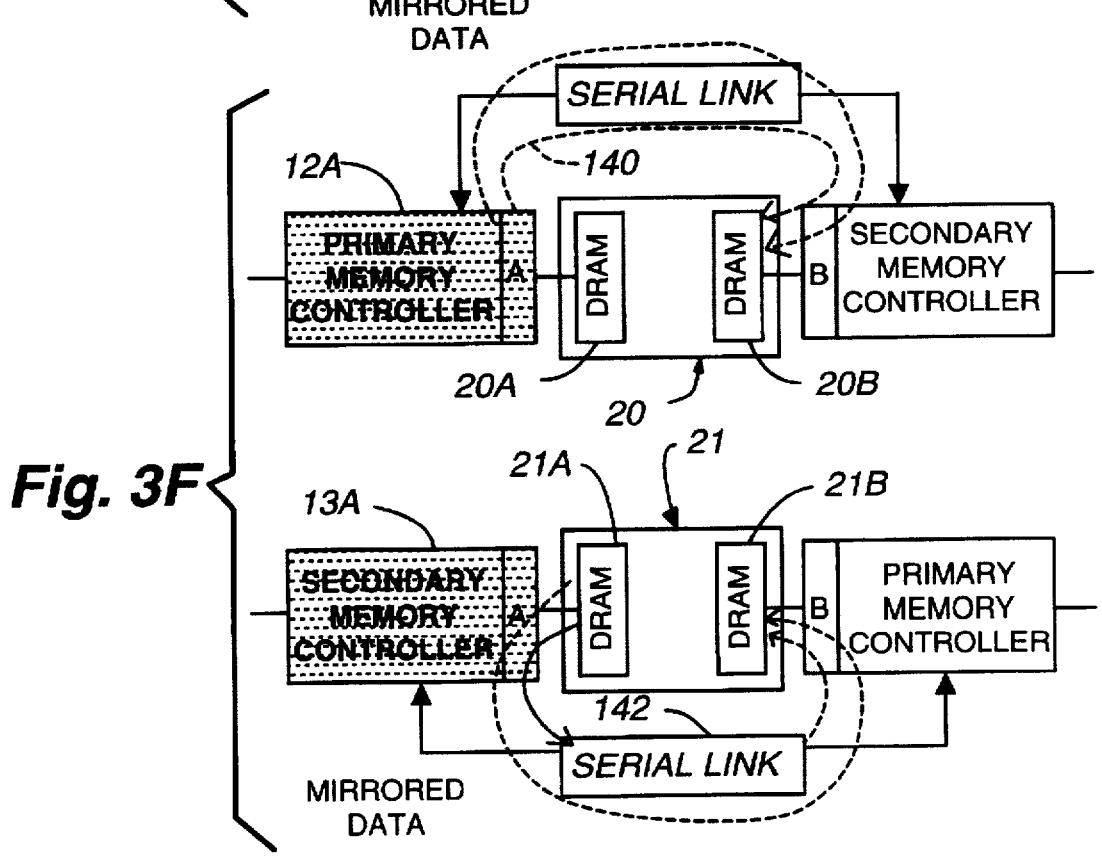
FIG. 3F is a block diagram of a pair of redundant controller systems, one pair of which has failed, showing the recovery of mirrored data to a backup cache.

As shown in FIG. 3F, after the primary recovery of the metadata lists and the resumption of the host input and output functions, the secondary recovery takes place. The secondary recovery involves the transfer of all mirrored data in the failing cache to the cache of the recovering controller. Once the secondary data transfer has taken place, fail-over is complete. The system thus continues to function, although the host is notified that corrective action is eventually needed to restore complete system operation. The corrective action may be taken during system operation. The failed controller and associated memory can be replaced since they are configured on a separate removable boards.

One goal of the quick recovery technique is to minimize the time that data is unavailable to the host in the event of a controller failure. The key to quick recovery is to note that cache recovery proceeds in two phases, specifically, the transfer of a metadata list followed by the transfer of all mirrored data.

For comparison, a typical size of a metadata list entry per outstanding write may be on the order of 64 bytes, and an average I/O request size may be 4 kilobytes. It can be seen that the recovery time is dictated, at least in part, by the speed of the serial links 140 and 142. Thus, the recovery of the metadata list will be 64 times faster than doing a full recovery of all mirrored data. For 64 Megabytes of 4 kilobyte requests being recovered over a 300 kilobyte per second channel host I/O could be enabled in as little as 3.5 seconds after which time the metadata list will have been recovered. In contrast, performing a full data recovery may take about four minutes.

The secondary recovery following the primary recovery phase is performed by a background transfer of the mirrored data. Host I/O during recovery will fall into three categories: no overlap with recovering data, writes overlap with recovering data, and reads overlap with recovering data.

In the first category in which there is no overlap with recovering data, if the recovering data does not get overlapped by active host I/O, it will be brought over in the background and then committed to disk like any other cached write.

In the category in which the host write overlaps with recovering data, if the data summarized by a metadata entry of a metadata list is overlapped by a new write from the host, the mirrored data no longer needs to be recovered and the metadata entry may be deleted from the metadata list. In this case the overhead and bandwidth of the recovery is saved as is the write to the drives. It should be noted that in this case the recovered cache is still providing some of the benefits of normal caching across a failure.

In the case in which the host read overlaps with recovery data, the mirrored data must be fetched from the failed controller across the serial links 140 and 142. A request for the data represented by the metadata list will be inserted into the stream of background data recovery requests (with a higher priority if priorities are supported). Once the mirrored data is onboard, it will be sent to the host and committed to the disk in the background just like any other cached write.

Figure 5A:
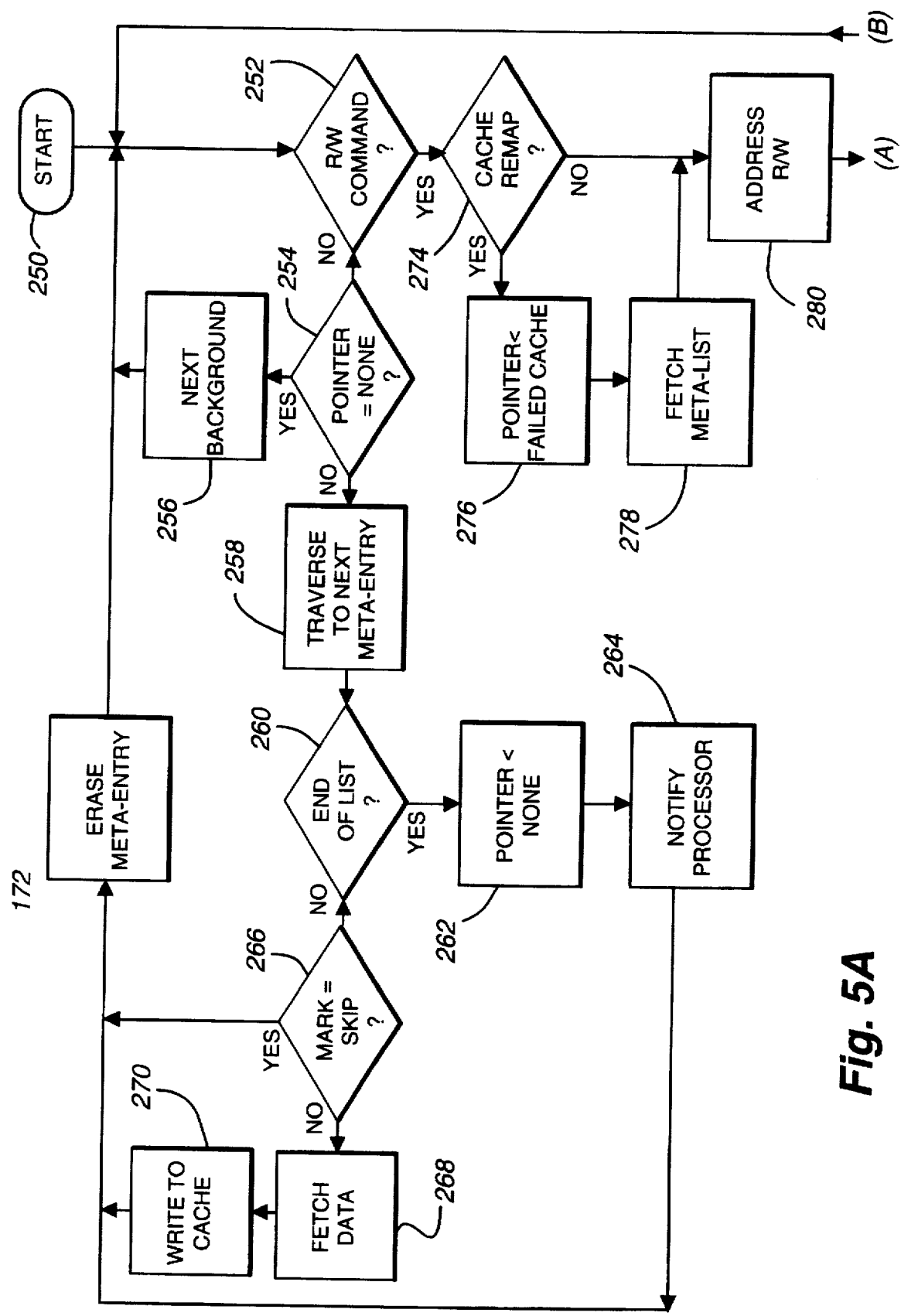
FIGS. 5A and 5B are a flow chart of the metadata list and mirrored data recovery process in the recovering controller and backup cache.
Figure 5B:
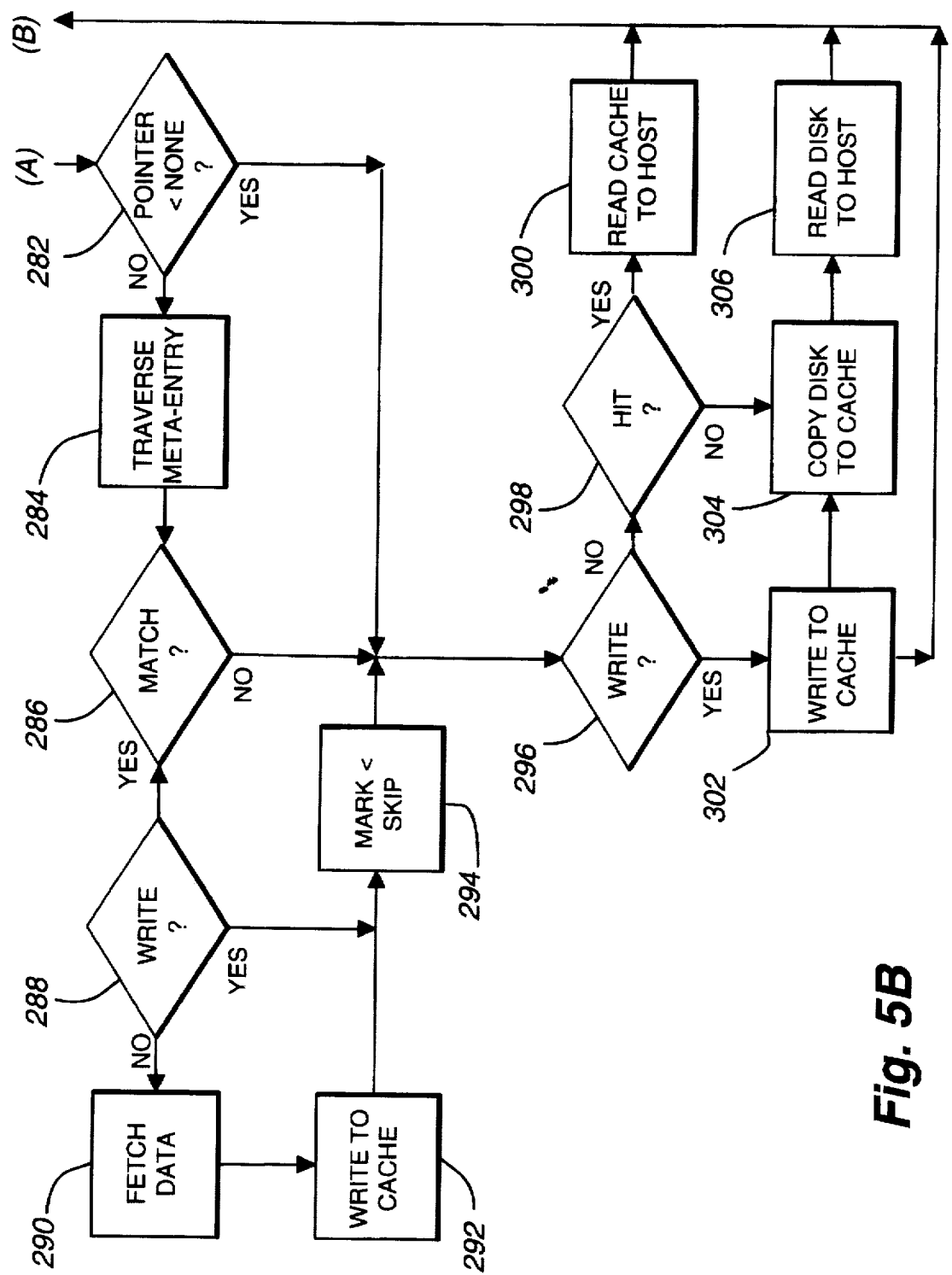

With reference now to FIGS. 5A and 5B, the processing in a recovering controller begins at a start step 250 and proceeds to decision step 274 in which a determination is made as to whether notice has been received of an incipient cache failure and if a command has been received from processor 15 indicating that this particular controller is the one designated as the recovering controller, the one to which that cache should be remapped. If this is the case, then control passes to process step 276 in which a pointer to that failing cache is placed in the portion of this recovering controller's cache designated for a metadata list. Control then passes to process 278 for a complete fetching from the failing controller according to the primary recovery mode discussed above of the complete metadata list from that failing controller over the designated serial link. Control then returns to process 252.

Alternately, in decision step 274 if no cache remapping command had been received from processor 15, then control passes directly to process step 252. In decision step 252, a determination is made as to whether the host I/O command has been received by the controller. In the event that no such command has been received, then a decision 254 is made whether the metadata list portion of cache memory associated with the recovering controller contains a pointer to any cache in a fail-over condition. If no such pointer is found, then the next step 256 in any other background operations engaged in by this controller takes place. This might, depending on the cache policy, include the writing of evicted cache data containing a "dirty" bit to a disk. This would be appropriate if a copy back cache policy was being followed. In any event, after the next background step is accomplished, control returns to the decision process 252.

Alternately, if in decision process 254 a determination is made that the metadata list portion of the controller cache contains a pointer to a cache in fail-over, then control is passed to process 258 in which the existing metadata list in the cache of the recovering controller is traversed to the next metadata entry of the metadata list. That metadata entry, as with all metadata entries, contains a pointer to an address in the failing cache, a disk address for which the data in that failing cache is intended, and a volume indicator as to the size of the data block destined for that address in disk memory. Control then passes to decision step 260 in which a determination is made as to whether the next metadata entry in the metadata list is in fact the end of the list. In this case control passes to process 262 in which the pointer detected earlier in decision process 254 to a cache in fail-over is erased, then control is passed to process step 264 in which a notification is sent to processor 15 indicating that fail-over stages 1 and 2 is complete. In other words, the transfer of both the metadata list and mirrored data from the failing cache, has been completed.

Alternately, if a determination is made in decision step 260 that the end of the metadata list has not been reached, then a determination is made in decision process 266 as to whether the next entry in the metadata list has been marked as an entry to skip. This type of tagging of a metadata list entry would be appropriate if, for example, that metadata list entry referred to an address location which contained "stale" data, data which had been subsequently written to by a host as will be discussed later in connection with step 294. In the event a determination in the affirmative was reached in step 266 that the next entry was in fact marked as one to skip, then control passes to process 272 in which that metadata entry in the metadata list is erased and control returned to decision process 252.

Alternately, if a determination is made in decision step 266 that the next entry in the metadata list is not marked as one to skip, then control passes to process 268 in which the second stage of fail-over recovery takes place with respect to that metadata entry.

In the second recovery stage the mirrored data from the location in the failing cache referred to by the metadata entry is fetched over serial link 140 or 142 and written in step 270 to the cache of the recovering controller and specifically to the mirrored portion that cache. Subsequently control passes to process 272 in which the metadata entry connected with that data which has just been fetched is erased and control then passes back to decision process 252.

On the other hand, if the read/write command decision in decision step 252 is "yes," to process 280, in which a determination is made as to the address of the command, either read or write, received from the host. Then control passes to decision process 282 in which a determination is made as to whether, in the portion of the memory for this recovering controller designated for metadata lists, there is a pointer to any specific recovering cache. In the event that there is such a pointer, then control passes to process 284 in which the complete metadata list(s) are traversed to find out if any specific metadata entry contains an address matching that address indicated in process step 280. In the event no such address is found indicating a cache miss, then control returns to decision process 296, the same process that would be reached from decision step 282 if no metadata lists currently resided in the cache of the recovering controller.

Alternately, if in the decision process 286, an address corresponding to the address found in process 280 is located in a metadata entry of a metadata list, then control passes to decision step 288 in which a determination is made as to whether the host I/O command is a write command or a read command. In the event the I/O command is a write command, then control passes to process 294 in which the metadata entry connected with the write address is marked with a skip indicator. As discussed above in connection with decision process 266, the skip indicator is appropriately tagged to that entry in the metadata list because a subsequent write to that address renders it unnecessary to recover, during the secondary recovery stage, the specific mirrored data associated with that specific address since it is stale data destined to be overwritten by the host command, specifically a write command, currently being processed. Control then returns to decision process 296.

Alternately, if in decision process 288 it is determined that a read command is currently being processed by the host, then control passes to step 290 in which the mirrored data associated with the specific metadata entry matching the read address is fetched over serial links 140 and 142 from the cache of the failing controllers during the secondary stage of fail-over recovery. Once this data is fetched, control passes to process 292 in which the fetched data is written to the mirrored portion of the memory of the cache of this recovering controller. Then control passes to process 294 in which the metadata entry in the metadata list connected with the data which has just been fetched over serial links 140 and 142 is marked as an entry which can be skipped. Control then passes to decision process 296.

In decision process 296 the normal processing of the controller resumes with the determination as to whether the host I/O is a read or a write request. In the event that the determination is made that the host request is for a read, then control passes to decision step 298 in which the cache portion of the controller including both mirrored and non-mirrored portions, but excluding the metadata list portion, is looked at to see if it contains the address with respect to which the read request is being made. If such a cache hit is indicated, then control passes to process step 300 in which the data is read from cache to host and then control passes back to decision process 252. Alternately, in decision process 298, if a cache hit is not indicated, then control passes to process steps 304 and 306 in which respectively the requested data is copied from disk to cache and then from cache to host in response to the read request.

Alternately, if in decision process 296 a determination is made that the host I/O request is a write request, then control passes to process 302 in which the host data to be written is written to the mirrored portion of the cache of this controller and then control passes back to decision process 252 in which the next host I/O is detected.

Figure 6:
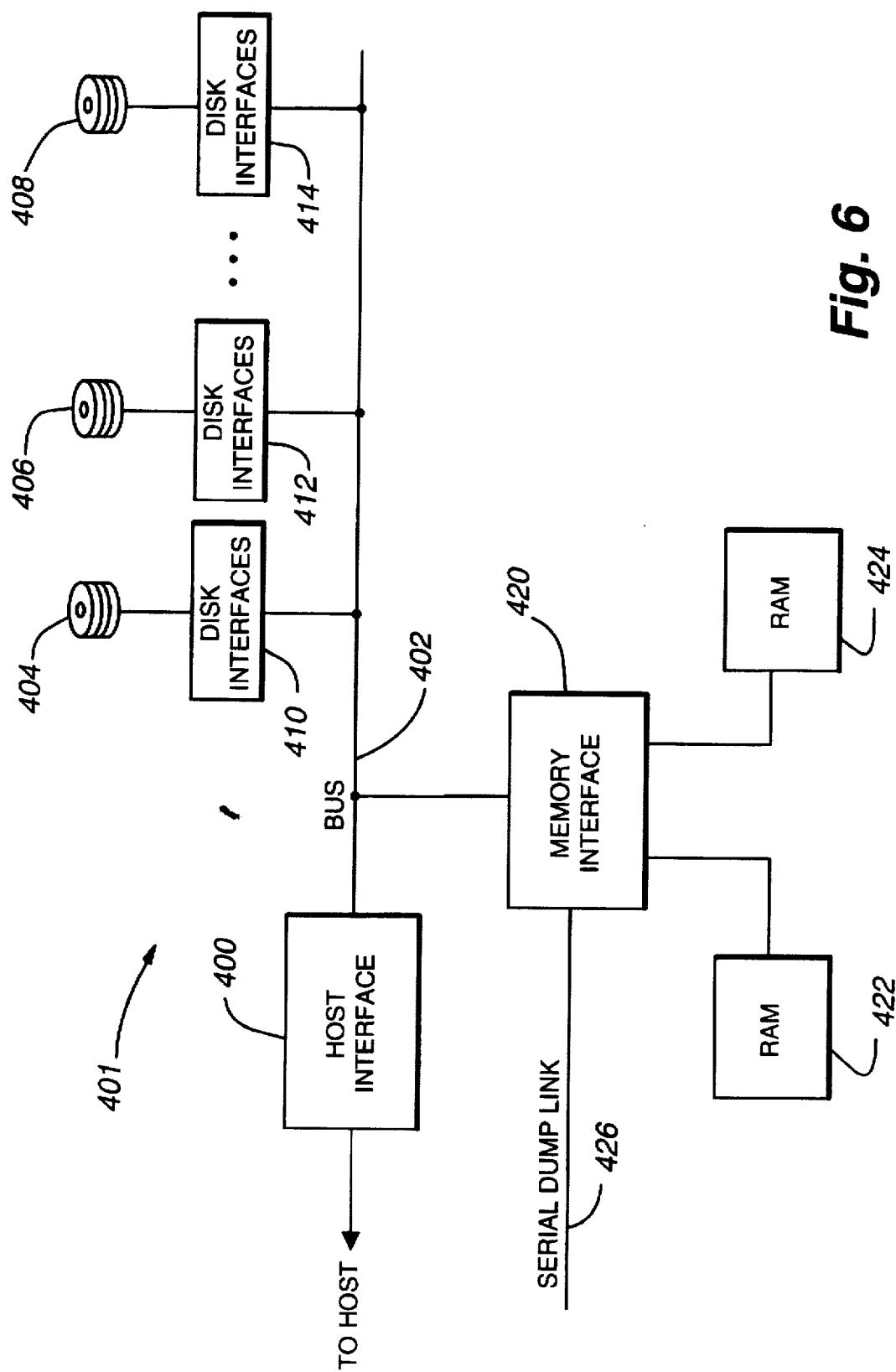
FIG. 6 is a block diagram of one type of a generalized signal controller that is useful in conjunction with a preferred embodiment of the present invention.

A generalized signal controller 401 that is useful in conjunction with the method of a preferred embodiment of the invention is shown in FIG. 6. As shown, a host interface 400 interfaces a host computer (not shown) to a bus 402. The bus 402 is connected to one or more hard disk drives 404, 406, . . . , and 408, which are connected to the bus 402 by disk interfaces 410, 412, . . . , and 414, respectively. A memory interface 420 connects the bus 402 to a number of memory devices, such as random access memory devices 422 and 424. The memory interface 420 is connected by a serial dump link 426 to a corresponding memory interface (not shown) of another controller to transfer the media data thereto in the event of a failure of the generalized controller circuit 401.

Figure 7:
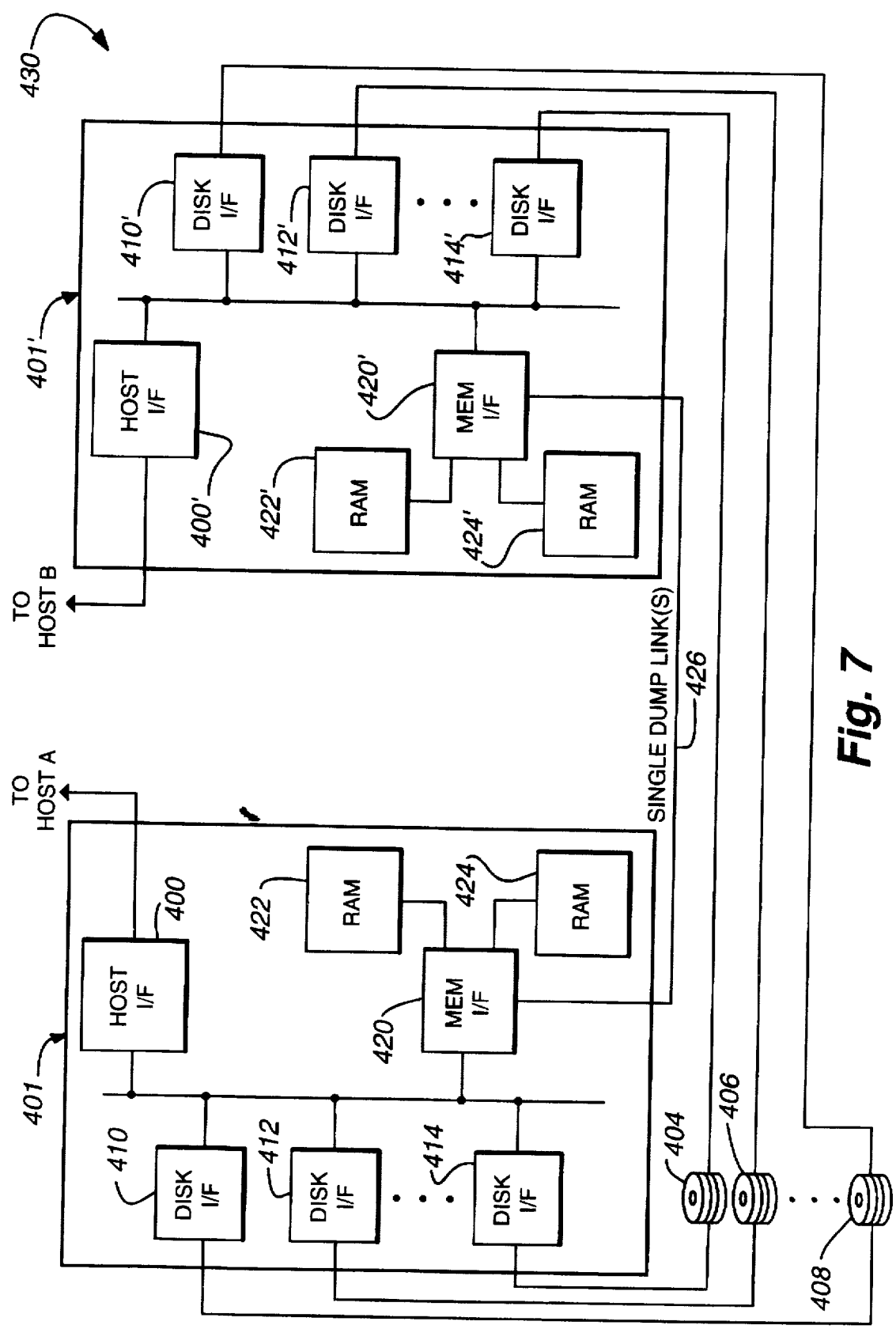
FIG. 7 is a block diagram of a system having two host computers, each having a generalized signal controller of the type described in FIG. 6, in conjunction with a preferred embodiment of the present invention.

A block diagram of a system 430 having two host computers, designated "Host A" and "Host B", employing generalized signal controllers of the type described in FIG. 6 is shown in FIG. 7. Each of the hosts, Host A and Host B, has an associated signal controller, denoted 401 and 401'. Each of the controllers, 401 and 401' and the embodiment illustrated, are essentially identically constructed, with corresponding parts denoted by the reference numeral followed by a prime ('). As seen, the controllers 401 and 401' share hard disk drives 404, 406, . . . , and 408. In addition, the memory interface circuits 420 and 420' are interconnected by the single dump link 426. The operation of the system 430 in the event of a failure of one of the controllers 401 or 401' is in the same manner as that described above.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for allowing host computer access to data from a cache memory of a first storage controller by issuing a request to a second storage controller also having a cache memory, said first and second storage controllers being coupled to a common computer mass storage bus and having at least one common data path therebetween, said method comprising the steps of:

storing data and associated metadata in said cache memories of said first and second storage controllers through said common computer mass storage bus;

copying said metadata from said cache memory of said first storage controller to said cache memory of said second storage controller through said common data path;

directing host computer requests to said second storage controller for access to selected portions of said data stored in said cache memory of said first storage controller by reference to said associated metadata copied from said first storage controller cache memory to said second storage controller cache memory;

and transferring said selected portions of said data through said common data path from said cache memory of said first storage controller to said said cache memory of said second storage controller.

2. A method for recovery of data from a cache memory of a first storage controller by access to a cache memory of a second storage controller, said first and second storage controllers being coupled by a common data path, said method comprising the steps of:

copying metadata corresponding to said data stored in said cache memory of said first storage controller to said cache memory of said second storage controller through said common data path, wherein said metadata comprises pointers to said data in said cache memory of said first storage controller.

3. A computer system comprising:

at least one host computer;

a plurality of storage controllers coupled to said at least one host computer, at least one subset of said plurality of storage controllers being coupled together through at least one data path, each of said at least one subset of said plurality of storage controllers having a local cache memory for storing respective data and associated metadata;

at least one data storage unit coupled to a computer mass storage bus coupling said at least one subset of said plurality of storage controllers;

whereby said metadata from said cache memory of a second one of said subset of said plurality of storage controllers may be copied to said cache memory of a first one of said subset of said plurality of storage controllers through said at least one host computer for access to selected portions of said data stored in said cache memory of said second one of said plurality of storage controllers by reference to said metadata copied from said second storage controller cache memory.

4. The computer system of claim 3 wherein said metadata from said cache memory of said second one of said subset of said plurality of storage controllers is copied to said cache memory of said first one of said subset of said plurality of storage controllers through said at least one data path by transferring said selected portions of said data through said data path from said cache memory of said second storage controller to said host computer.

5. A computer system comprising:

at least one host computer;

a plurality of storage controllers coupled to said at least one host computer, at least one subset of said plurality of storage controllers being coupled together through at least one data path, said at least one subset of said plurality of storage controllers having a local cache memory for storing respective data and associated metadata;

at least one data storage unit coupled to a computer mass storage bus coupling said at least one subset of said plurality of storage controllers;

means for copying said metadata from said cache memory of a second one of said subset of said plurality of storage controllers to said cache memory of a first one of said subset of said plurality of storage controllers through said at least one data path, whereby a request from said at least one host computer to said first one of said plurality of said storage controllers for access to selected portions of said data stored in said cache memory of said second one of said plurality of storage controllers is achieved by reference to said associated metadata copied from said second storage controller cache memory copied to said first storage controller cache memory.

* * * * *